Patented June 22, 1954

2,681,918

UNITED STATES PATENT OFFICE 2,681,918

DIARYLBENZOQUINONEDIIMINE DIOXIDES

Charles J. Pedersen, Salem, N. J., assignor to E. I. du Pont de Nemours and Company, Wilmington, Del., a corporation of Delaware No Drawing. Application September 27, 1951,
Serial No. 248,666

5 Claims. (Cl. 260—396)

This invention relates to a new class of chemical compounds and more particularly to new diarylbenzoquinonediimine dioxides.

An object of this invention is to provide a new class of compounds which are useful as inhibitors of polymerization and oxidation reactions. A further object is to provide a useful group of organic compounds not known heretofore. Further objects will appear from the detailed description which follows.

The new compounds of this invention are N,N'-diaryl - 1,4 - benzoquinonediimine - N,N' - dioxides having the formula:

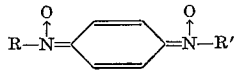

in which R and R' represent radicals of the benzene or naphthalene series. More specifically, R and R' may represent unsubstituted phenyl or naphthyl radicals or they may represent phenyl or naphthyl radicals which contain one or more non-functional substituents such as halogen, alkyl and alkoxy radicals. R and R' may be the same or different. The simplest member of this series and a preferred embodiment of this invention is N,N'-diphenyl-1,4-benzoquinonediimine-N,N'-dioxide. Other preferred compounds are N,N' - di(2 - methyl - 3 - chlorophenyl) - 1,4-benzoquinonediimine - N,N'- dioxide, N,N'- di(4-methoxyphenyl) - 1,4 - benzoquinonediimine - N,-N'-dioxide and N-phenyl-N'(2-naphthyl)-1,4-benzoquinonediimine-N,N'-dioxide. In addition to these, compounds in which R and R' represent a bromophenyl, chlorophenyl, ethylphenyl, dimethylphenyl, methylethylphenyl, n-butylphenyl, ethoxyphenyl, methylnaphthyl, chloronaphthyl, a methoxynaphthyl or the like radical are within the scope of this invention. Compounds in which the phenyl or naphthyl groups are substituted with the lower alkyl or alkoxy radicals, containing up to about 4 carbon atoms, are more readily available than the higher substituted members and are preferred for this reason. Similarly, chlorine is the preferred halogen substituent on the basis of economy.

The new compounds herein described may also be named as diarylquinonedioximes, if it is considered that oximes may exist in a tautomeric form

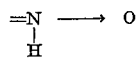

in which the hydrogen is directly attached to the nitrogen. By this nomenclature, the compound referred to in this specification as N,N'-diphenyl-1,4-benzoquinonediimine-N,N'-dioxide would be termed N,N'-diphenylquinonedioxime.

The compounds of this invention may be prepared by oxidizing the corresponding N,N'-diaryl-1,4-benzoquinonediimine, having the formula R—N=C₆H₄=N—R', or by oxidizing the corresponding N,N'-diaryl-1,4-diaminobenzenes, having the formula R—NH—C₆H₄—NH—R'. The best oxidizing agents found for the preparation of these compounds are the peroxy-carboxylic acids also known as acyl hydroperoxides (RCO)OOH, preferably those of the aromatic series. Perbenzoic acid is the one most readily available. As solvent for the reaction, neutral organic liquids not readily oxidizable should be used. Chloroform and carbon tetrachloride are particularly suitable and benzene and other aromatic hydrocarbons are also suitable. The reaction proceeds readily at 20–30°, although higher temperatures may be used if desired. The following examples illustrate methods of preparing the compounds of this invention.

EXAMPLE 1

Twelve grams of N,N'-diphenyl-1,4-benzoquinonediimine (C₁₈H₁₄N₂, M. W. 258.3, 0.0465 mol) are dissolved in 500 cc. of chloroform and treated at room temperature with 14.11 grams of perbenzoic acid (C₇H₆O₃, M. W. 138.1, 0.102 mol) dissolved in 288 cc. of benzene, and stirred for 30 minutes. The temperature of the reaction mass remains at 25 to 29° C. The benzene-chloroform solution is extracted with a solution of 8 grams of sodium hydroxide (NaOH, M. W. 40, 0.2 mol) in 500 cc. of water in order to remove benzoic acid and excess perbenzoic acid. The extract is washed with water, dried with anhydrous sodium sulfate and evaporated under vacuum to 400 cc. On adding 600 cc. of petroleum ether (boiling range 30–60° C.), the N,N'-diphenyl - 1,4 - benzoquinonediimine - N,N' - dioxide separates out as bright orange crystals. Eleven grams of the product are obtained (C₁₈H₁₄O₂N₂, M. W. 290.3, 0.0379 mol), representing a yield of 81.5% based on the diimine. Nitrogen content: Found, 9.41%; calculated, 9.66%. Nitrogen content of the diimine: Calculated, 10.85%. The product melts with decomposition at about 187° C. It is very slightly soluble in water, and soluble in alcohol, benzene, and chloroform.

Similarly, N-phenyl-N'-(2-naphthyl)-1,4-benzoquinonediimine - N,N' - dioxide, N,N' - di - (2-methyl - 3 - chlorophenyl) - 1,4 - benzoquinonediimine-N,N'-dioxide, N,N'-di-(4-methoxyphenyl) - 1,4 - benzoquinonediimine - N,N' - dioxide are made from the corresponding N,N'-diaryl-1,4-benzoquinonediimines. The properties of the dioxides are given in the following table, including the wave-lengths and extinction coefficients for characteristic absorption in the visible spectrum.

| Compound | Color in Crystals | Melting Point, degrees | Wave-length [2] Å. | Extinction [2] Coefficient |
|---|---|---|---|---|
| 1. N,N'-Diphenyl 1,4-benzoquinonediimine-N,N'-dioxide. | Orange | [1] 187 | 4,230 | 42,900 |
| 2. N-Phenyl-N'-(2-naphthyl) 1,4-benzoquinonediimine-N,N'-dioxide. | Dark Orange | [1] 177 | 4,320 | 44,300 |
| 3. N,N'-Di-(2-methyl-3-chlorophenyl) 1,4-benzoquinonediimine-N,N'-dioxide. | Yellow | [1] 207 | 4,140 | 65,600 |
| 4. N,N'-Di-(4-methoxyphenyl) 1,4-benzoquinonediimine-N,N'-dioxide. | Purplish brown | [1] 205 | 4,310 | 37,400 |

[1] With decomposition.
[2] In chloroform.

EXAMPLE 2

Three grams of N,N'-diphenylparaphenylenediamine ($C_{18}H_{16}N_2$, 0.00116 mol) dissolved in 50 cc. of benzene are mixed with 4.5 grams of perbenzoic acid ($C_7H_6O_3$, 0.0348 mol) dissolved in 55 cc. of benzene and allowed to stand one hour at room temperature. The resulting benzene solution is extracted with sodium hydroxide, then washed with water and dried with anhydrous sodium sulfate all as in Example 1. Addition of petroleum ether precipitates orange crystals of N,N'-diphenyl-1,4-benzoquinonediimine dioxide, identical with the product of Example 1.

The compounds of this invention are strikingly effected as inhibitors for polymerization and oxidation reactions in a wide variety of applications. The following examples illustrate this effect and show the manner in which these compounds may be usefully employed.

EXAMPLE 3

*Use as inhibitors of styrene polymerization*

Various amounts of the benzoquinonediimine dioxides prepared according to Example 1 are added to portions of styrene, half of which contain 0.1% by weight of azo-bis(isobutyronitrile), a powerful polymerization initiator. The portions of styrene are then heated in air for six hours at 82° C. and the amount of polystyrene formed in each case is determined. In the following table there is shown the ratio of the amount of polystyrene formed in each portion to the amount formed in the case of the control sample containing neither initator nor inhibitor. As shown in the table, as little as 0.0004% of the dioxide in the absence of the inititator and 0.01% in the presence of 0.1% initiator is enough to inhibit polymerization completely under the conditions of the experiment.

| Initiator | Inhibitor | Percent Added | Amount of Polymer |
|---|---|---|---|
| None | None | | 1.00 |
| Do | A | 0.00002 | 0.93 |
| Do | A | 0.000067 | 0.82 |
| Do | A | 0.0002 | 0.32 |
| Do | A | 0.0004 | Nil |
| Do | A | 0.001 | Nil |
| 0.1% Azo-bis(isobutyronitrile) | None | | 3.04 |
| Do | A | 0.0004 | 3.10 |
| Do | A | 0.001 | 2.83 |
| Do | A | 0.004 | 1.28 |
| Do | A | 0.01 | Nil |
| Do | A | 0.02 | Nil |
| Do | B | 0.02 | Nil |
| Do | C | 0.02 | Nil |
| Do | D | 0.02 | Nil |

In this table, A represents N,N'-diphenyl-1,4-benzoquinonediimine-N,N'-dioxide, B represents N,N'-di-(2-methyl-3-chlorophenyl)-1,4-benzoquinonediimine-N,N'-dioxide, C represents N,N'-di-(4-methoxyphenyl)-1,4-benzoquinonediimine-N,N'-dioxide and D represents N-phenyl-N'-(2-naphthyl)-1,4-benzoquinonediimine-N,N'-dioxide.

EXAMPLE 4

*Use as inhibitors of polymerization of methyl methacrylate*

A sample of methyl methacrylate is mixed with 0.01 mol of azo-bis(isobutyronitrile) per liter and is heated in a sealed glass tube in the presence of oxygen at 50° C., forming a solid polymer. When similar samples containing, in addition to the azo-bis(isobutyronitrile) initiator, 0.001 mol per liter of the diphenyl-, phenylnaphthyl-, and di-(2-methyl-3-chlorophenyl)benzoquinonediimine dioxides respectively are heated under the same conditions for six hours, no polymer is formed.

EXAMPLE 5

*Use as inhibitor of gasoline oxidation*

Samples of cracked gasoline are held at 100° C. under 100 p. s. i. of oxygen and the amount of time required for oxygen absorption to begin is determined. This time is known as the induction period. In the case of the untreated control sample, the induction period is 100 minutes. Additions of 0.002% and 0.005% by weight of N,N'-diphenyl-1,4-benzoquinonediimine-N,N'-dioxide increase the induction period to 261 minutes and 427 minutes respectively.

EXAMPLE 6

*Use as a stabilizer for neoprene*

To 50 parts of neoprene latex are added 37.5 parts of water and a solution of 0.18 part of N,N'-diphenyl-1,4-benzoquinonediimine-N,N'-dioxide in 7.5 parts of chloroform. The resulting dispersion is reddish orange in color. Strips of rayon fabric 1 inch wide are impregnated with the dispersion and dried in air. The quantity of modified neoprene taken up by the fabric is about 0.35 part per part of fabric. Samples of the impregnated fabric, initially light tan in color, are exposed in an oven at 125° C., and other samples are exposed to light from two sunlamps. They remain strong and pliable, and are only slightly darkened by this treatment. The exposed samples and control samples similarly prepared but without added stabilizer are tested for tensile strength with the results shown in the following table.

| Stabilizer | Exposure | Tensile Strength, Lbs. at Break |
|---|---|---|
| None | 2 hrs., 125° C | 32 |
| Do | 4 hrs., 125° C | 10 |
| Do | 6 hrs. light | 37 |
| N,N'-Diphenyl-1,4-benzoquinonediimine-N,N'-dioxide. | 2 hrs., 125° C | 153 |
| Do | 4 hrs. 125° C | 145 |
| Do | 6 hrs. light | 93 |

EXAMPLE 7

*Use as stabilizers for nylon*

To 20 parts of methanol is added 0.25 part of N - phenyl - N' - (2 - naphthyl) - 1,4 - benzoquinonediimine-N,N'-dioxide and 5 pieces of nylon in the form of rectangular films .002–.003 inch thick and 3.0 x .75 inches in size. The mixture is heated at reflux temperature with stirring for 1 hour, then allowed to stand at room temperature for 17 hours. The films are removed from the mixture, rinsed three times with methanol, and dried. Only a light gray color is imparted to the films. Films are tested by heating in a forced air oven maintained at 140° C. At intervals of no more than 20 hours the films are removed, cooled in a vacuum desiccator, and tested for embrittlement by folding sharply between thumb and finger. Control films that are untreated or treated with methanol only are embrittled by 4.5 hours heating, while the film treated with the N-phenyl-N'-(2-naphthyl)-1,4-benzoquinonediimine-N,N'-dioxide is only partially embrittled after 220 hours at 140° C.

Films similarly treated with N,N'-di-(4-methoxyphenyl) - 1,4 - benzoquinonediimine-N,N'-dioxide are embrittled after 40 hours at 140° C. as compared with 4.5 hours for the controls.

EXAMPLE 8

*Use as stabilizer for polymeric polyketones*

A solution of 20 parts of a copolymer of ethylene, propylene, and carbon monoxide and 0.02 part of N,N'-di - (4-methoxyphenyl)-1,4-benzoquinonediimine-N,N'-dioxide in 120 parts of chloroform is spread on a glass plate and the chloroform allowed to evaporate, giving a film of polymer containing 0.1% of the benzoquinonediimine dioxide. A film is prepared in a similar fashion from a solution of 20 parts of the copolymer in 120 parts of chloroform and the films are fastened to a wood panel and exposed to sunlight. Upon examination one week later it is found that the film which does not contain N,N'-di - (4 - methoxyphenyl)-1,4-benzoquinonediimine-N,N'-dioxide has split and become much weaker and embrittled. The film which contains N,N'-di- (4 - methoxyphenyl)-1,4-benzoquinonediimine-N,N'-dioxide is intact and pliable and nearly as strong as before exposure. After three weeks' exposure the film containing N,N'-di - (4 - methoxyphenyl) - 1,4 - benzoquinonediimine-N,N'-dioxide has also deteriorated.

EXAMPLE 9

*Use as a stabilizer for gelation of resin solutions*

To 36 parts of a solution of allyloxyethyl acrylate/styrene 60/40 copolymer containing 50.7% solids in xylene is added sufficient N,N'-diphenyl-1,4-benzoquinonediimine - N,N' - dioxide to give 0.1% based on the polymer solids. This mixture is tumbled under nitrogen until the N,N'-diphenyl-1,4-benzoquinonediimine-N,N'-dioxide is thoroughly blended and then divided into four portions. Two of the containers are flushed with nitrogen. One is stored at room temperature and the other at 48° C. The other two containers are flushed with air and stored at 48° C. and room temperature. All four samples are still fluid after 6 months in contrast to the control samples containing no N,N'-diphenyl-1,4-benzoquinonediimine-N,N'-dioxide, which gel in 1 to 4 weeks.

I claim:

1. An N,N' - diaryl-1,4-benzoquinonediimine-N,N'-dioxide having the formula:

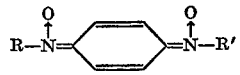

in which R and R' represent aryl radicals selected from the group consisting of phenyl and naphthyl radicals and such radicals containing as substituents members of the group consisting of halogen, lower alkyl and lower alkoxy radicals.

2. N,N'-diphenyl - 1,4 - benzoquinonediimine-N,N'-dioxide.

3. N,N'-di(2-methyl - 3 - chlorophenyl)-1,4-benzoquinonediimine-N,N'-dioxide.

4. N,N' - di(4-methoxyphenyl)-1,4-benzoquinonediimine-N,N'-dioxide.

5. N -phenyl- N' - (2-naphthyl)-1,4-benzoquinonediimine-N,N'-dioxide.

No references cited.